(12) United States Patent  (10) Patent No.: US 7,755,868 B2
Flores Losada  (45) Date of Patent: Jul. 13, 2010

(54) ELECTRICAL EQUIPMENT FOR DISTRIBUTION NETWORK

(75) Inventor: Luis Gonzalo Flores Losada, C/Blas Cabrera 1 Chalet 21, 28660 Boadilla Del Monte, Madrid (ES)

(73) Assignee: Luis Gonzalo Flores Losada, Madrid (ES)

( * ) Notice: Subject to any disclaimer, the term of this patent is extended or adjusted under 35 U.S.C. 154(b) by 0 days.

(21) Appl. No.: 11/650,029

(22) Filed: Jan. 5, 2007

(65) Prior Publication Data

US 2007/0159743 A1  Jul. 12, 2007

(30) Foreign Application Priority Data

Jan. 9, 2006  (EP) .................................. 06380007

(51) Int. Cl.
  *H02H 7/04*  (2006.01)
(52) U.S. Cl. .............................. 361/35; 361/37; 361/41
(58) Field of Classification Search .................. 361/41, 361/35, 37, 38, 40
  See application file for complete search history.

(56) References Cited

U.S. PATENT DOCUMENTS

| 5,898,556 A | * | 4/1999 | de Sedouy et al. | ............. 361/37 |
| 6,839,207 B2 | * | 1/2005 | Folliot et al. | .................. 361/38 |

FOREIGN PATENT DOCUMENTS

| DE | 760 404 C | 3/1953 |
| DE | 41 11 586 A1 | 10/1992 |
| DE | 102 54 497 B3 | 11/2002 |
| EP | 0 817 346 A1 | 1/1998 |
| EP | 0 871 190 A | 10/1998 |
| EP | 0 871 190 A1 | 10/1998 |
| EP | 0 707 364 B1 | 11/1998 |
| EP | 0 795 219 B1 | 3/1999 |
| EP | 0 981 140 A1 | 2/2000 |
| EP | 1 005 057 A2 | 5/2000 |
| EP | 1 014 528 A1 | 6/2000 |
| EP | 1 052 665 A2 | 11/2000 |
| EP | 1 077 518 A2 | 2/2001 |
| EP | 1 045 415 B1 | 9/2004 |
| FR | 2 687 022 A1 | 2/1993 |
| JP | 54 125450 A | 9/1979 |
| JP | 61 108114 A | 5/1986 |
| WO | WO 99/21255 | 4/1999 |
| WO | WO 00/62320 | 10/2000 |

* cited by examiner

*Primary Examiner*—Jared J Fureman
*Assistant Examiner*—Christopher J Clark
(74) *Attorney, Agent, or Firm*—Knobbe Martens Olson & Bear LLP

(57) ABSTRACT

The electrical equipment comprises electrical elements corresponding to at least one phase of the distribution network and housed in a tank. The equipment is insulated with a dielectric liquid wherein the elements are immersed. The equipment comprises an input for each phase in the tank, and also a protection device, associated with at least one failure detector and configured so that, in the event of detecting such a failure, a short circuit will be established in the phases. The protection device is situated so as to establish the short circuit in a position before any protection, control or transformer element of the electrical equipment.

29 Claims, 4 Drawing Sheets

ELECTRICAL EQUIPMENT FOR DISTRIBUTION NETWORK

CROSS-REFERENCE TO RELATED APPLICATIONS

This application claims the benefit of European patent application No. 06 380 007.2 filed on Jan. 9, 2006, the disclosure of which is incorporated herein by reference.

BACKGROUND

1. Field of the Invention

The field falls within electrical equipment for electricity distribution which comprises one or more electrical elements or components that correspond to one or more phases of the distribution network, housed in a container or tank, with the equipment insulated by means of a dielectric liquid wherein the elements are immersed.

2. Description of the Related Technology

The electrical equipment that forms part of electricity distribution networks, such as transformers and control and protection cells, are comprised of a series of elements or switchgear that are housed in a container, which is generally made of metal, inside which there is an electrical insulating means that completely surrounds the electrical equipment.

Basically, two types of alternative and clearly differentiated technologies have been developed, namely, technologies based on the use of a gas as an insulating means and technologies based on the use of a dielectric liquid (for example, oil) as an insulating means.

Of these two technologies, that which uses liquid as an insulating means is perhaps the oldest and it presents certain safety problems. For example, if there is an internal electric arc, said arc can cause all the equipment to explode, which involves not only the destruction of the equipment, but a serious hazard to anyone who is in the proximity of the equipment (since the explosion throws out both the different pieces or elements and the liquid—for example, oil—at a very high temperature).

In an attempt to solve or minimise these safety problems, the technology in which a gas (usually sulphur hexafluoride) was used as an electric insulating means was developed. The gas is contained in an airtight container, wherein the electrical equipment is positioned. This technology has been well developed and many engineers consider it to be safer and more modern than that which is based on the use of a liquid as an insulating means. In fact, in Europe this technology has almost completely substituted equipment using a dielectric liquid as an insulating means, except for the case of transformers (which continue to be housed in a tank full of dielectric liquid).

One of the tests to which the equipment with gas-based insulation is submitted is that known as the internal arc test, the purpose of which is to simulate the occurrence of a defect in the insulation between the phases. This test is performed by installing a thin metal conductor to join the phases and making the nominal voltage and current flow. Logically, the conductor melts, causing an electric arc to jump between the phases.

The manufacturers of cells insulated with gas as an insulating means have developed various different constructive solutions in order to pass this internal arc test. A first solution consists of arranging a series of metal sheets that can be sacrificed to the electric arc, so that the outer container of the cell is not damaged. The idea is, therefore, to try to minimise the effects of the electric arc rather than to prevent it.

Another second solution consists of using short-circuiting devices that join the phases of the electrical equipment by means of a conductor when the defect in the insulation is detected, so that the current is diverted through the area in which the short circuit, a so-called solid short circuit, has been established, thus preventing an arc from jumping between the phases. Devices and structures of this type are disclosed in, for example, FR-A-2687022, EP-A-1077518, EP-B-1052665, EP-A-1045415, EP-A-1005057, EP-B-0871190, EP-B-0795219, DE-A-4111586, DE-B-10254497, ES-T3-2126235 (Spanish translation of EP-B-0707364), WO-A-99/21255 and WO-A-00/62320, which relate to different short-circuiting devices for cells insulated with gas as an insulating means.

The short-circuiting device can act very quickly which means that most of the equipment in the cell can be saved and, in particular, any external manifestations that may put people and property at risk can be prevented. This short-circuiting device can also cause an external piece of protection equipment (e.g. the main switch for the distribution line) to open the line, completely insulating the cell. If an attempt is made to reconnect the line (closing the line switch again) without having resolved the fault that produced the internal arc, no damage is caused to the cell or the surrounding area because the short-circuiting device continues to work, preventing the arc from jumping between the phases.

One type of electrical equipment that plays a fundamental part in electricity distribution networks, and for which technology based on the use of a dielectric liquid as an insulating means continues to be widely used, is transformer equipment, which normally consists of a tank, which is practically full of dielectric liquid (normally mineral oil, although other liquids can be used, such as synthetic or natural esters, derived from plants, silicon oils or hydrocarbons with a high molecular mass, all of which can be with or without additives), wherein the transformer itself is located. If there is a fault in the insulation between the phases of the transformer, or between one of the phases and earth, there is a failure or internal arc that can generate a high pressure inside the tank, which could even cause the tank to explode.

For this reason, transformers are usually protected by medium voltage fuses that limit the current, which melt when a high current (produced by the internal arc) passes through them. Normally the fuse blows in a very short time, which means that it is possible to prevent the equipment from exploding.

These fuses are usually located outside the transformer tank but currently, in more compact solutions, the fuses can be positioned inside the tank; the term "self-protected transformers" is often used for this type of transformer equipment. Transformers of this type are disclosed in EP-A-1014528 and EP-A-0817346.

However, these self-protected transformers present the following problems:

When the current produced by a failure is small (for example, when the failure occurs between one of the phases and earth), the fuse can blow very slowly. In the case of the most commonly used limiting fuses, if the intensity of the failure current is lower than that corresponding to the minimum intensity of the cut-off current, the fuse partially blows but does not cut off the current, eventually leading it to explode. Therefore, the transformer is not protected against this type of failure. In order to resolve this problem microfuses are used, for example, which cause the phases to short circuit when they detect these failure currents of a lower intensity than that needed for the limiting fuses to open the corresponding line. U.S. Pat. No. 5,898,556 discloses a system of this type.

If there is a failure in the medium voltage fuse that limits the current and it explodes, an internal arc occurs in the tank transformer and the transformer is totally unprotected. No solution for this problem is known.

If the failure occurs before the fuses, i.e. between the input of the lines and the fuses, the fuses do not "pick up" the failure and therefore do not work. Again, the transformer is unprotected. No solution is known for this problem either.

Finally, if the failure occurs on the low voltage side, the intensity of the current that flows through the medium voltage fuses can be too low to blow the medium voltage fuses, or it could be the case that the fuses are partially blown but without cutting off the current, as has been described above. In any case, the low voltage failure can be enough to generate gases that raise the pressure inside the transformer tank and subsequently cause the equipment to explode.

Recent designs that attempt to prevent some of the aforementioned problems manage to protect the equipment by using automatic switches positioned inside the transformer tank next to the fuses. A transformer of this type is disclosed in EP-A-0981140A1.

This problem regarding transformers exists and current international regulations do not require transformers to pass an internal arc test similar to those mentioned for cells insulated in gas. This might be due to the fact that, in most cases, fuses are installed in protection cells outside the transformer tank; the explosion of a fuse in a cell would generate an arc in the cell, not in the transformer, and the cell is prepared to support this failure.

Therefore, the aforementioned problem occurs in electrical equipment insulated in dielectric liquid that is liable to suffer internal failures that generate gases such as, for example, transformers, self-protected transformers (i.e. transformers that have their protection fuses inside the tank), which can also be a more compact and cheaper solution than a transformer and its protection cell with fuses, meaning that the use of this type of transformers is becoming more common for some applications.

As well as the transformer, not only the fuses but also the sectionalising switches and other types of elements or switchgear can be inserted into the same tank, thus obtaining a transformer substation that can be used for control and/or protection that comprises a container or metal tank with medium or high voltage phase bushings and low voltage outlet terminals, with all the equipment or elements immersed in the dielectric liquid contained in the tank. Including all these elements inside a single tank means that the volume of the dielectric liquid used increases.

This presents two problems:

If the container or tank breaks (e.g. due to an impact from outside the tank) a large volume of oil is spilt, which can also burn, with the resulting consequences. This problem can be lessened by covering the whole metal tank with an outer concrete housing and a dielectric collection pit.

In the event of there being an internal arc, the transformer substation may explode; the same problems exist as in the case of self-protected transformers, but they are made worse by the greater volume of dielectric liquid.

The presence of moving parts, together with the cut off of intensity in the liquid, increases the probability of an accident occurring in the equipment.

SUMMARY OF CERTAIN INVENTIVE ASPECTS

Technology based on the use of a dielectric liquid as an insulating means continues to be used in countries where this technology is compatible with the national regulations and the practices of electricity companies.

Moreover, technology based on the use of a dielectric liquid as an insulating means can also present certain advantages. For example, liquid insulates better than gas, which means that elements of the different phases can be positioned closer together, making it possible to achieve more compact equipment (e.g. a transformer substation) than that which can be obtained using gas-based insulation. This can be important, because by positioning the equipment inside it, it is possible to lessen the visual impact (smaller size), and if located inside a building (e.g. a basement or a market hall), it is possible to occupy a smaller area, which helps reduce the cost corresponding to the space needed for the installation.

Therefore, technology based on the use of a dielectric liquid as an insulating means can also present certain advantages, at least in some aspects. Until now, technologies based on dielectric liquid and gas, respectively, have been considered to be two conceptually different technologies, which has meant that no attempt has been made to apply the solutions to the specific problems of one of these technologies to the other, and vice versa. For example, there is no record of any attempt to apply safety systems designed to prevent arcs in equipment using gas-based insulation to equipment that uses a dielectric liquid as an insulating means (in fact, patent publications relating to safety systems for equipment insulated in gas mention that they are for this type of equipment, and in the case of equipment insulated in liquid, patented developments in safety have focused on the use of medium voltage fuses and ensuring that they blow). It is possible that this is due to the fact that the conditions and properties of gas-based insulating means are so different from those of insulating means based on dielectric liquid that no one has thought of the possibility that the same type of safety systems could be used for both types of equipment.

The inventors/applicants have noticed that, contrary to what seems to be general opinion, certain techniques or systems that are traditionally applicable and applied to systems based on the use of gas as an insulating means can also be applied to technologies that use a dielectric liquid as an insulating means with the corresponding effects, the benefits of which would be added to the inherent benefits of systems based on the use of a dielectric liquid as an insulating means.

Certain aspects relate to electrical equipment for an electricity distribution network, the electrical equipment comprising at least one component or electrical element corresponding to one or more phases (for example, to three phases) of the distribution network. The electrical elements (for example, one or more control switches, transformers, fuses, etc.) are housed in a container or tank (made of metal, for example) and the electrical equipment is insulated by means of a dielectric liquid, at least, wherein it or the electrical elements are immersed and which, at least partially, fills the tank. The dielectric liquid can be, for example, mineral oil, although other liquids can be used, such as synthetic or natural esters, derived from plants, silicon oils or hydrocarbons with a high molecular mass, etc., all of which can be with or without additives. The electrical equipment further comprises an input for each phase in the tank, and also a short-circuiting device (that can be situated in the tank itself or outside the tank), associated to at least one failure detector (which can be situated inside the tank) and configured to detect a failure caused by a fault in the insulation and, when it detects one, to generate an event indicative of the detection of the failure. The short-circuiting device is configured to establish a solid short circuit in the phases if there is an event indicative of the detection of such a failure.

According to these embodiments, the short-circuiting device is situated in a position so as to establish said short circuit before any protection, control or transformer element of the electrical equipment (for example, before any protective fuse—medium voltage, for example—, switch or transformer element inside the tank). In other words, if the short-circuiting device is situated inside the tank, there is no protection, control or transformer element between the short-circuiting device and the input of the phases into the tank. In this manner, it is possible to prevent the risk of a failure that occurs "before" a protection element (fuse) (seen from the power input side, i.e. in many applications, from the "high" or "medium" voltage side in a system), or as a consequence of a fault in said fuse, leaving the electrical equipment without protection against the arc. This system is applicable not only to equipment that includes transformers, but to any electrical equipment that forms part of an electricity distribution system whose components are housed in a tank and insulated by means of a dielectric liquid. Logically, insulation with dielectric liquid can be complemented with other insulating elements.

As has been mentioned above, the short-circuiting device can be situated in the tank to establish said short circuit in a position after the phases enter the tank (for example, after the corresponding bushings) and before any protection, control or transformer element of the electrical equipment housed in the tank.

The equipment can comprise, in correspondence with at least one phase, a control device configured to interrupt or cut off the phase, the short-circuiting device being situated so as to establish the short circuiting of said phase or phases between the input of the phase into the tank and said control device.

The electrical equipment can comprise, in correspondence with at least one of the phases, a protection device (e.g. a fuse) configured to interrupt the line or phase in response to an overcurrent. In this case, the short-circuiting device will be situated so as to establish the short circuit of said phase or phases between said input of the phase or phases into the tank and said protection device.

The short-circuiting device can be situated as the first element of the equipment in correspondence with each phase, after the input of the phase or phases into the tank. The short-circuiting device can also optionally be positioned outside the tank, for example, in a second tank other than that which houses the rest of the equipment. In this case, the phases to be protected inside the electrical equipment tank pass in/out through the short-circuiting device first (for example, through said second tank), to then enter the tank of the equipment to be protected.

The short-circuiting device can be configured to establish a short circuit only between the phases and/or between the phases and earth.

The electrical equipment can be a transformer comprising a transformer element housed in the container. It can also be, for example, a self-protected transformer, with internal fuses in the phases "after" the short-circuiting device, seen in a direction corresponding to a flow of electrical energy through the electrical equipment (for example, in the direction from the input (input/outlet) of the phases on the high or medium voltage side towards the input (input/outlet) of the phase or phases on the low voltage side). Additionally, the electrical equipment would include the short-circuiting device and the corresponding failure detector.

The electrical equipment can also be a transformer substation that, in addition to the transformer, short-circuiting device and failure detector, includes a plurality of control switches and a plurality of protection devices (it can also comprise one or more control switches for the transformer, a low voltage switchboard, etc.).

As has been mentioned above, the electrical equipment can have a higher voltage part (for example, a high or medium voltage part) and a lower voltage part (for example, a low voltage part). The input of the phases, in correspondence with which the short-circuiting device is situated, can correspond to the higher voltage part.

The equipment can have an input part for a flow of electrical energy. The input of the phases can correspond to said input part of the flow of electrical energy. In equipment in which the electrical energy can flow in both directions, there can be protection at both possible inputs/outlets. This is where the electrical energy flow is to be "cut off", before it damages the elements of the equipment.

The failure detector can be a failure detector of the type conventionally used to trigger short-circuiting devices, for example, the failure detector can:

be configured to generate an event indicative of the detection of a failure in response to a change in pressure inside the tank;

be configured to generate an event indicative of the detection of a failure in response to the presence of light inside the tank;

be configured to generate an event indicative of the detection of a failure in response to the detection of gases inside the tank;

be configured to generate an event indicative of the detection of a failure in response to the detection of an overcurrent in at least one phase of the equipment;

and/or be configured to generate an event indicative of the detection of a failure in response to the detection of currents diverted to earth in the equipment.

Given that conventional failure detectors can be used, it is not necessary to describe them in more detail in this text.

BRIEF DESCRIPTION OF THE DRAWINGS

To complement the description and in order to aid comprehension of the various characteristics, according to certain examples of practical embodiments, a set of figures is included as an integral part of said description, wherein the following has been represented in an illustrative and non-limiting manner.

DETAILED DESCRIPTION OF CERTAIN INVENTIVE EMBODIMENTS

Figure 1:
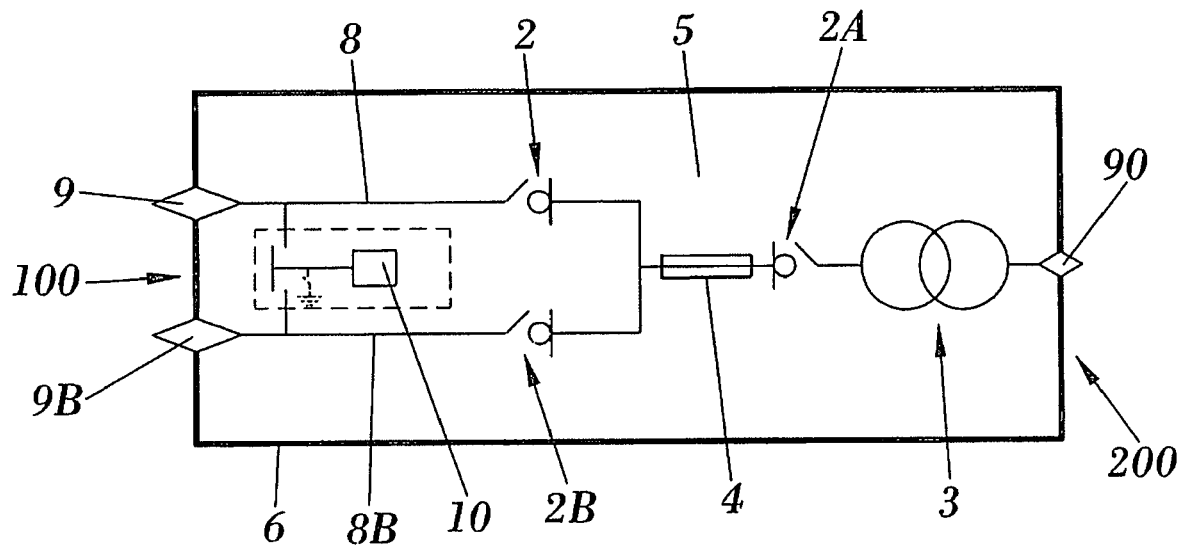
FIG. 1 shows a single-line diagram of a transformer substation according to one embodiment.

FIG. 1 illustrates a transformer substation, wherein the network control switches 2, the transformer control switches 2A, the transformer 3 and the transformer protection fuses 4 are immersed in dielectric liquid 5 (e.g. oil) inside a container that constitutes what is usually referred to as the tank 6 of the equipment. On the high or medium voltage side 100 there is an input 9 of the phases 8 (only the single-line diagram has been drawn, with an input line 8, also having an outlet line 8B, with its switch 2B and outlet (bushing) 9B). On the low voltage side 200 there is a corresponding outlet 90 of the corresponding low voltage phases, as is usual in this type of systems.

A short-circuiting device 7 for the phases has been placed at the input in the high or medium voltage part 100 as a first protective element in the direction that runs from the input 9 in the high or medium voltage part 100 towards the low voltage part 200, associated to a failure detector 10 so that in the event of there being an internal failure of certain characteristics (for example, an arc that produces light or gases, or that increases the pressure inside the container, or that causes an overcurrent in the phases or a diversion of current to earth), the phases 8 whereby the transformer substation can receive a high or medium voltage supply short circuit. The energy therefore no longer flows to the innermost parts of the electrical equipment, thus reducing the risk of explosion or damage to the elements of said internal parts. There may be a short circuit between phases or between the phases and earth.

In order to help protect the equipment, the short-circuiting device 7 is positioned in such a way that the phases 8 short circuit in the area around the high or medium voltage bushings, i.e. close to the inputs 9 (or inputs/outlets) of the phases 8, before the phases connect to other protection elements, such as fuses or automatic switches and, in fact, even before the phases reach any other element of the equipment.

In other embodiments, the short-circuiting device 7 can be positioned in different areas of the equipment to be protected.

Figure 2:
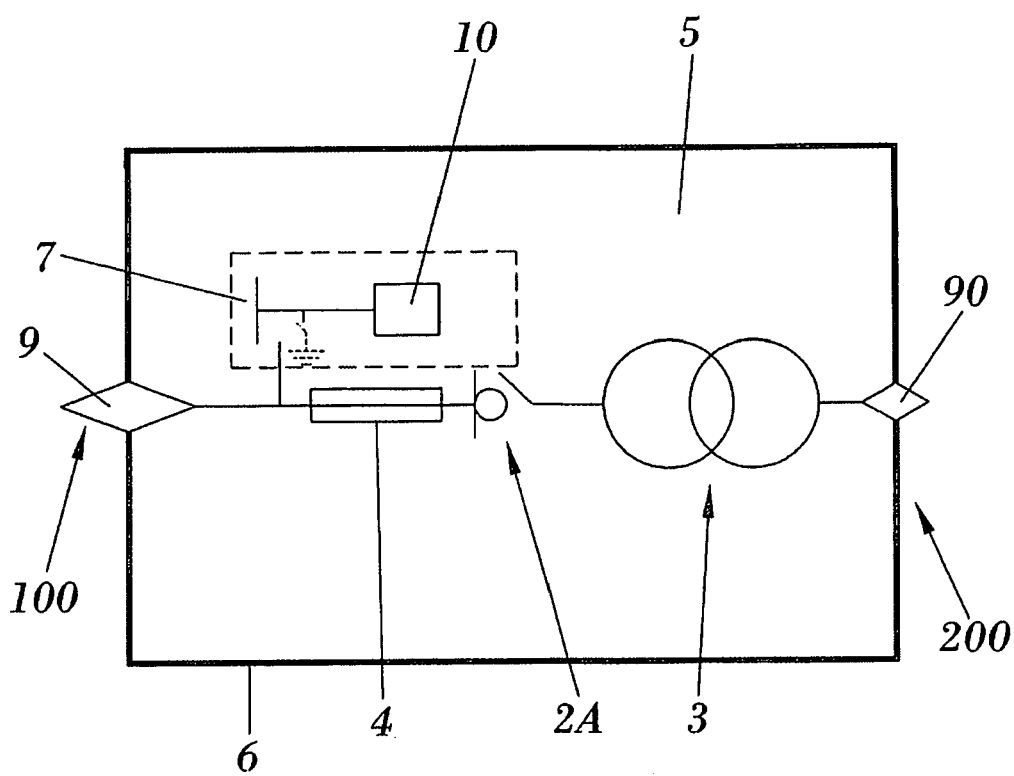
FIG. 2 shows a single-line diagram of a self-protected transformer according to one embodiment.

FIG. 2 (the elements that are the same as those of the system in FIG. 1 have the same numerical references) illustrates an embodiment of what may be called a self-protected transformer, which comprises the transformer 3 with its control switch 2. Between the input 9 on the high or medium voltage side 100 and the transformer there is a over-current protection device, such as fuse 4 in each phase (FIG. 2 is a single-line diagram). Furthermore, the short-circuiting device 7, which is associated to the corresponding failure detector 10, has been positioned between the high or medium voltage input 9 and the fuse 4. All said elements are housed in a container 6 and immersed in a dielectric liquid 5.

Figure 3:
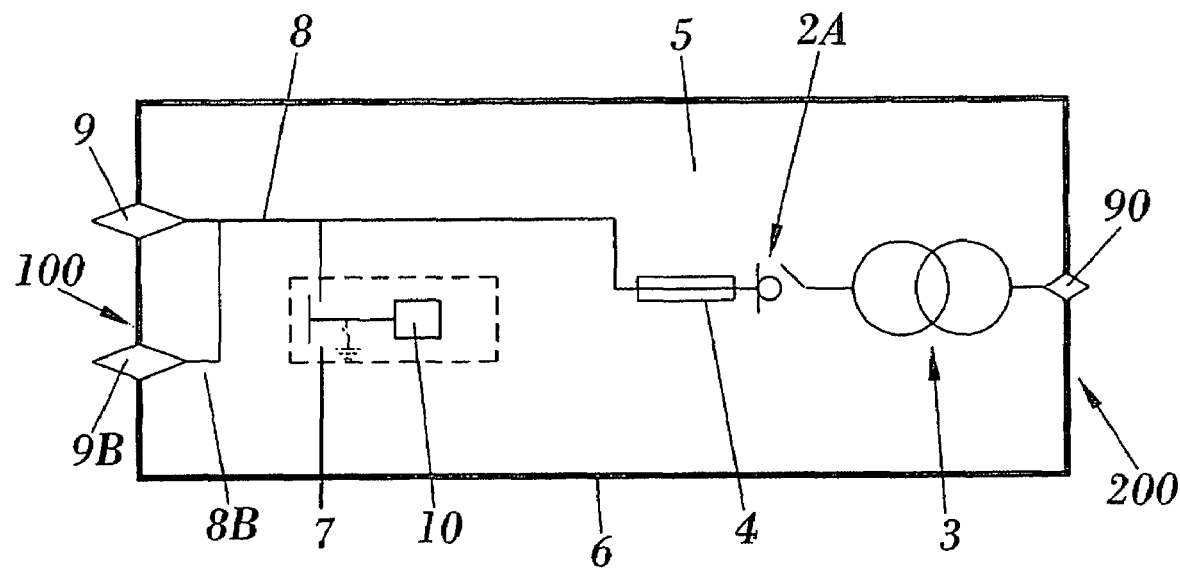
FIG. 3 shows electrical equipment with medium voltage inputs/outlets, forming a rigid loop.

FIG. 3 illustrates a similar configuration to that shown in FIG. 1, but with medium voltage inputs/outlets 9/9B forming a rigid loop (that includes the outlet line 8B). In this electrical diagram, only one short-circuiting device 7 is needed for both inputs/outlets 9/9B. The short-circuiting device can be positioned at any of the inputs/outlets 9/9B or in the position shown in the figure, in which, there not being any element between the inputs/outlets and the short-circuiting device except for the conductors, the short-circuiting device continues to provide protection from the input/outlet 9/9B to the outlet on the low voltage side 200.

Figure 7:
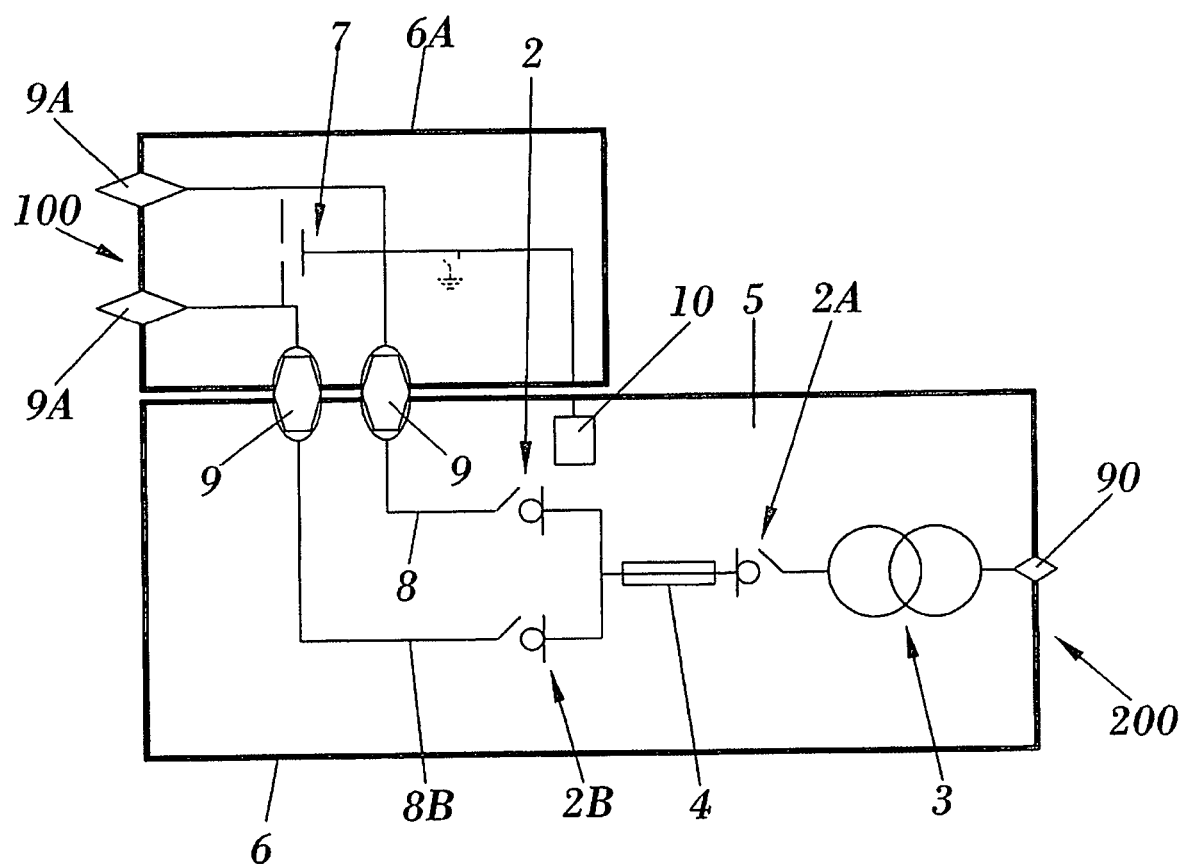
FIG. 7 shows electrical equipment with the short-circuiting device in a separate tank from the tank that houses the equipment to be protected.

FIG. 7 illustrates an electrical configuration that is similar to that shown in FIG. 1 but wherein the short-circuiting device 7 has been placed in a second tank 6A full of dielectric liquid or gas that is separate from the tank 6 of the electrical equipment to be protected. The failure detection device 10 is associated to the tank 6 of the equipment to be protected. The phases enter the main tank 6 through said second tank 6A, into which they enter through the corresponding inputs 9A.

Figure 4:
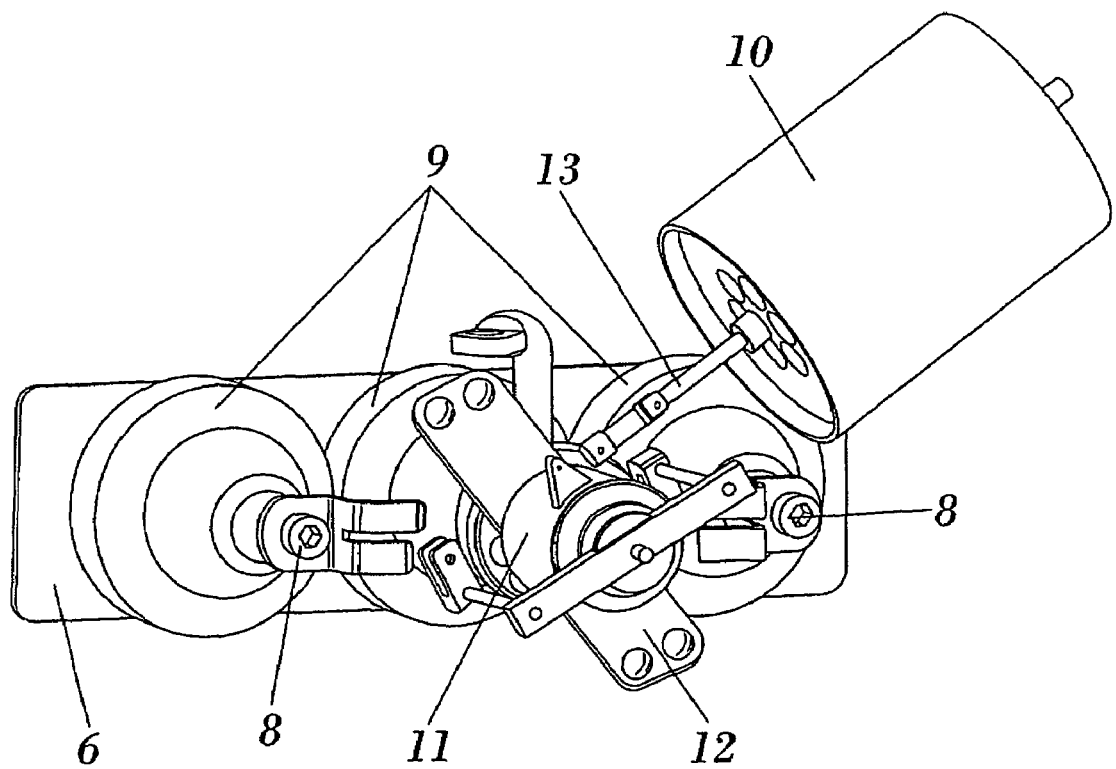
FIGS. 4-5 show a view of a possible configuration for the short-circuiting device according to one embodiment.
Figure 5:
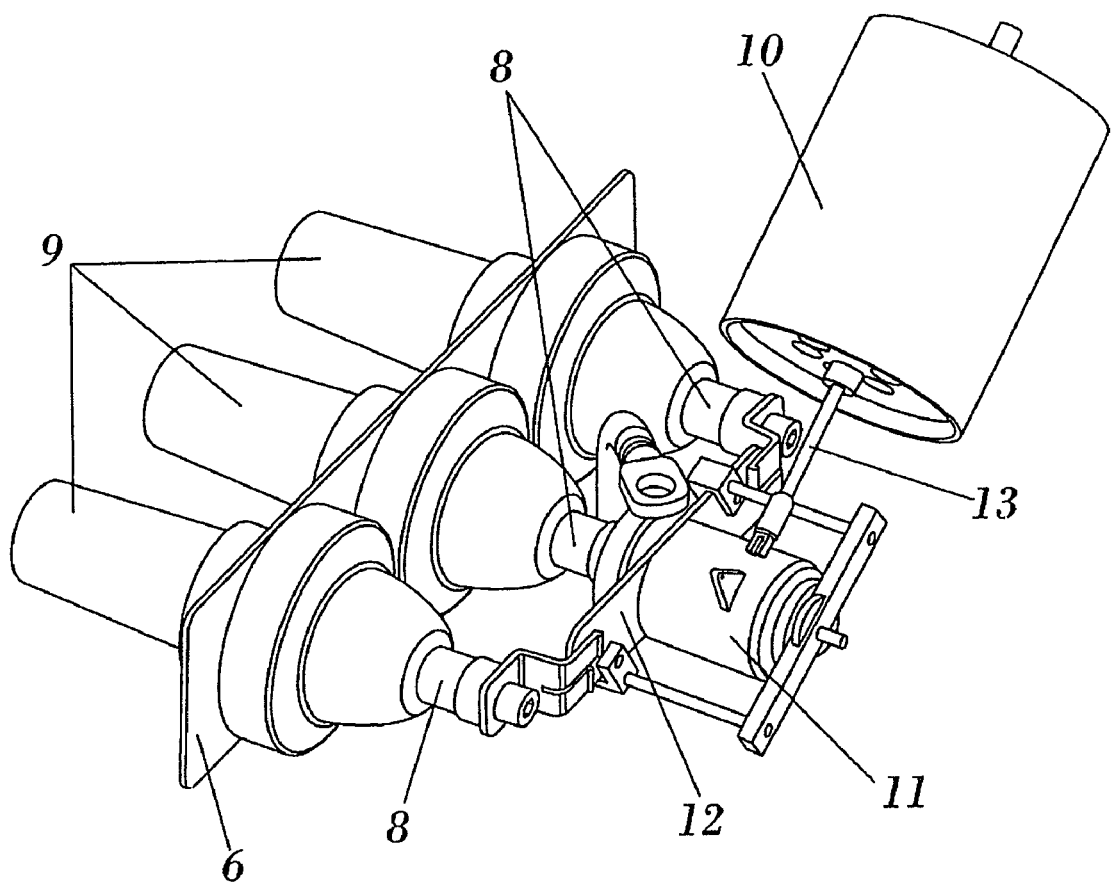

FIGS. 4 and 5 illustrate the mechanical configuration, according to one possible embodiment of the short-circuiting device 9 that is associated to the failure detector 10. The failure detector is configured in such a way that, on detecting a predetermined condition (light, change in pressure, gases, overcurrent, currents diverted to earth, etc., in accordance with certain parameters) it generates an event indicative of the detection of the failure, moving a piston 13 that rotates a shaft 11 (wherein there is a spring, not shown), causing the rotation of a metal bar 12 that short circuits the phases 8, just after the inputs 9 where the phases enter the container 6 through the corresponding bushings.

Figure 6:
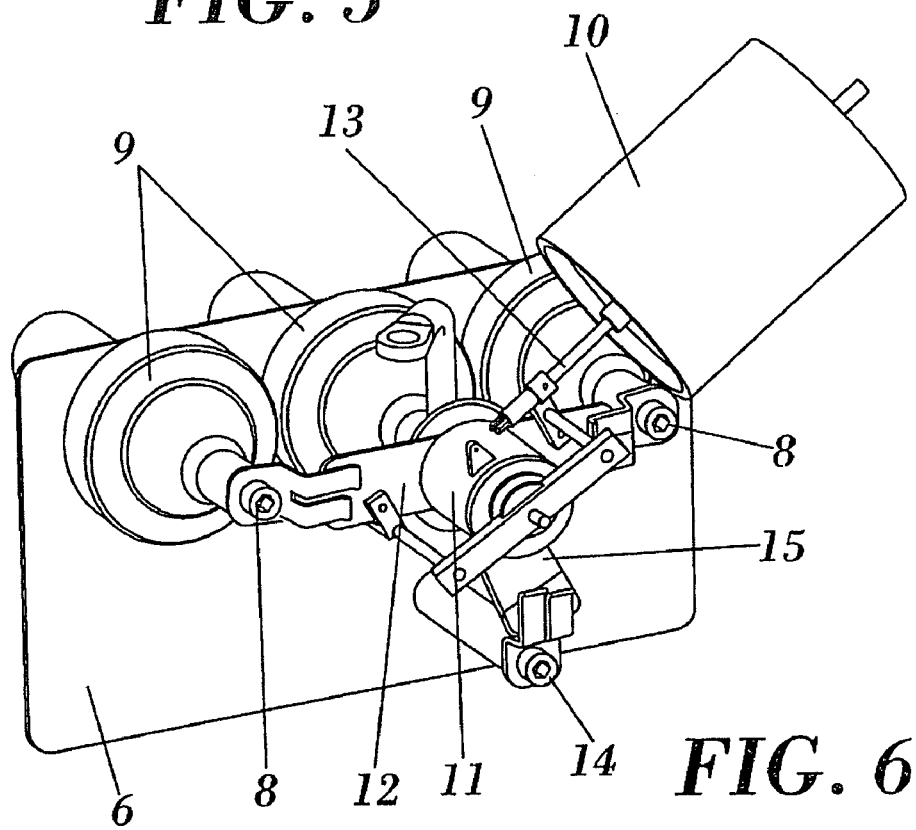
FIG. 6 shows a view of a possible configuration for the short-circuiting device according to one embodiment.

Finally, FIG. 6 shows an embodiment of the short-circuiting device wherein, as well as the bar 12 short circuiting the phases 8, the bar 15 earths the assembly through the electric contact point 14.

As has been mentioned above, the failure detector 10 can be configured in many different ways, for example, so that it is triggered by overpressure, by the presence of light inside the equipment, by the presence of gases, by overcurrents, by differential intensities, by increases in temperature, etc. It can either be installed inside or outside the tank of the equipment to be protected, depending on the event that is to be monitored and whether there is easy access or to the detector or not.

Likewise, the dielectric liquid used in electrical equipment can be a mineral oil, a synthetic or natural ester, derived from plant oils, a hydrocarbon with a high molecular mass or a silicon oil. All of these can carry additives to improve the dielectric properties or resistance to ageing.

In this text, the word "comprises" and variations thereof (such as "comprising", etc.) should not be taken as being exclusive, i.e. they do not exclude the possibility that the item described might include other elements, steps, etc.

Furthermore, the invention is not limited to the specific embodiments described above, but also covers, for example, variations that might be made by the average person skilled in the art (for example, as regards the choice of electrical diagrams, materials, dimensions, components, configuration, etc.).

What is claimed is:

1. An electrical equipment device of an electricity distribution network, the device comprising:
    a tank insulated with an insulation comprising a dielectric liquid, wherein the liquid at least partially fills the tank, the tank having a circuit to generate a signal based on at least one input phase;
    an input for each phase;
    an output;
    an electrical path connecting the inputs and the output;
    an over-current protection device on the electrical path between the one or more inputs and the output; and
    a short-circuiting device associated with at least one failure detector, configured to detect a failure due to a fault in the insulation, the short-circuiting device being configured to establish a short circuit in the one or more phases if there is an event indicative of the detection of the failure, wherein no over-current protection device, no control element, and no transformer is on the path between the short circuit and the input, wherein the short-circuiting device is configured to establish the short circuit independent of the function of the over-current protection device, and the short circuit does not cause an over-current condition in the over-current protection device.

2. The device according to claim 1, wherein the short-circuiting device is configured to establish the short circuit in a position along the electrical path after the input of the phases into the tank.

3. The device according to claim 2, further comprising, in correspondence with at least one phase, a control device configured to interrupt or cut off the phase, the short-circuiting device being further configured to establish the short circuit between the input of the phase into the tank and the control device.

4. The device according to claim 2, further comprising, in correspondence with at least one phase, an over-current protection device configured to interrupt the phase in response to an overcurrent in the phase, wherein the short-circuiting device is further configured to establish the short circuit between the input of the phase and the over-current protection device.

5. The device according to claim 1, wherein the short-circuiting device is situated as the first element of the device connected with each phase, after the input of the corresponding phase into the tank.

6. The device according to claim 1, wherein the short-circuiting device is situated outside the tank.

7. The device according to claim 6, wherein the tank is a first tank of the electrical equipment, the short-circuiting device is situated in a second tank, and the phases pass through the short-circuiting device before entering into the first tank.

8. The device according to claim 6, further comprising, in correspondence with at least one phase, a control device configured to interrupt or cut off the phase, wherein the short-circuiting device is further configured to establish the short circuit of the at least one phase before the control device.

9. The device according to claim 6, further comprising, in correspondence with at least one phase, an over-current protection device configured to interrupt the phase in response to an overcurrent in the phase, the short-circuiting device being further configured to establish the short circuiting of the at least one phase before the over-current protection device.

10. The device according to claim 1, wherein the short-circuiting device is further configured to establish a short circuit between at least two phases.

11. The device according to claim 1, wherein the short-circuiting device is configured to establish a short circuit between the phase and earth.

12. The device according to claim 1, comprising a transformer that comprises a transformer element housed in the tank.

13. The device according to claim 12, wherein the transformer is a self-protected transformer, with at least one internal fuse associated with the at least one phase, the fuse being situated after the short-circuiting device in a direction corresponding to a flow of electrical energy through the device.

14. The device of claim 1, comprising a transformer substation that comprises:

a transformer on the electrical path;
one or more control switches on the electrical path; and
one or more over-current protection devices on the electrical path.

15. The device of claim 1, comprising a higher voltage part and a lower voltage part, the input of the phase corresponding to the higher voltage part.

16. The device of claim 1, comprising an input part for a flow of electrical energy, the input of the phase corresponding to the input part.

17. The device according to claim 1, wherein the failure detector is configured to generate an event indicative of the detection of a failure in response to a change in pressure inside the tank.

18. The device according to claim 1, wherein the failure detector is configured to generate an event indicative of the detection of a failure in response to the presence of light inside the tank.

19. The device according to claim 1, wherein the failure detector is configured to generate an event indicative of the detection of a failure in response to the detection of gases inside the tank.

20. The device according to claim 1, wherein the failure detector is configured to generate an event indicative of the detection of a failure in response to the detection of an over-current in the at least one phase.

21. The device according to claim 1, wherein the failure detector is configured to generate an event indicative of the detection of a failure in response to the detection of currents diverted to earth.

22. The device according to claim 1, wherein the failure detector is situated in the tank.

23. The device according to claim 1, wherein the dielectric liquid comprises mineral oil.

24. The device according to claim 1, wherein the dielectric liquid comprises at least one synthetic ester.

25. The device according to claim 1, wherein the dielectric liquid comprises at least one natural ester.

26. The device according to claim 1, wherein the dielectric liquid comprises at least one silicon oil.

27. The device according to claim 1, wherein the dielectric liquid comprises at least one hydrocarbon with a high molecular mass.

28. The device of claim 1, wherein the over current protection device is between the short-circuiting device and the output.

29. The device of claim 1, wherein the over-current protection device is configured to interrupt at least one of the phases in response to an over-current in the at least one phase, wherein the short-circuiting device is configured to establish the short circuit between the input of the phase and the over-current protection device.

* * * * *